United States Patent [19]

Kawano et al.

[11] Patent Number: 5,291,591

[45] Date of Patent: Mar. 1, 1994

[54] METHOD OF MANAGING PROGRAMS FOR DISTRIBUTED PROCESSING SYSTEMS AND APPARATUS THEREFOR

[75] Inventors: Katsumi Kawano, Kawasaki; Kinji Mori, Yokohama; Yasuo Suzuki, Ebina; Masayuki Orimo, Kawasaki; Minoru Koizumi, Yokohama; Kozo Nakai, Katsuta; Hirokazu Kasashima, Hitachi, all of Japan

[73] Assignee: Hitachi, Ltd., Tokyo, Japan

[21] Appl. No.: 184,391

[22] Filed: Apr. 21, 1988

[30] Foreign Application Priority Data

Apr. 24, 1987 [JP] Japan ................... 62-99753

[51] Int. Cl.⁵ ............................... G06F 15/16
[52] U.S. Cl. ........................... 395/600; 395/650; 395/700; 364/222.81; 364/222.82; 364/228.3; 364/229.2; 364/240.1; 364/280.6; 364/DIG. 1
[58] Field of Search ... 364/200 MS File, 900 MS File, 364/DIG. 1, DIG. 2; 395/650, 700, 600

[56] References Cited

U.S. PATENT DOCUMENTS

| | | | |
|---|---|---|---|
| 4,366,479 | 12/1982 | Mori et al. | 340/825.05 |
| 4,432,057 | 2/1984 | Daniell et al. | 364/200 |
| 4,477,881 | 10/1984 | Kobayashi et al. | 364/900 |
| 4,558,413 | 12/1985 | Schmidt et al. | 364/200 |
| 4,562,539 | 12/1985 | Vince | 364/200 |
| 4,714,996 | 12/1987 | Gladney et al. | 364/200 |
| 4,785,397 | 11/1988 | Koizumi et al. | 364/200 |
| 4,788,637 | 11/1988 | Tamaru | 364/200 |
| 4,789,986 | 12/1988 | Koizumi et al. | 371/36 |
| 4,794,519 | 12/1988 | Koizumi et al. | 364/200 |
| 4,797,885 | 1/1989 | Orimo et al. | 371/19 |
| 4,803,683 | 2/1989 | Mori et al. | 371/19 |
| 4,809,170 | 2/1989 | Leblang et al. | 364/200 |
| 4,831,512 | 5/1989 | Nakai et al. | 364/200 |
| 4,885,684 | 12/1989 | Austin et al. | 364/200 |
| 4,888,683 | 12/1989 | Koizumi et al. | 364/200 |
| 4,953,096 | 8/1990 | Wachi et al. | 364/550 |
| 5,146,559 | 9/1992 | Orimo et al. | 395/200 |

FOREIGN PATENT DOCUMENTS

3148773 11/1982 Fed. Rep. of Germany.
3842289 6/1989 Fed. Rep. of Germany.

OTHER PUBLICATIONS

Patent Abstracts of Japan, JP-A-61-286959, (Dec. 17, 1986).
Patent Abstracts of Japan, JP-A-60-252952 (Dec. 13, 1985).
Patent Abstracts of Japan, JP-A-57-146361 (Sep. 9, 1982).
Itoh, Y. et al., "Software Program Generation Management System," NEC Research & Development, pp. 42-47 (Oct. 1982).

*Primary Examiner*—Thomas C. Lee
*Assistant Examiner*—Matthew C. Fagan
*Attorney, Agent, or Firm*—Antonelli, Terry, Stout & Kraus

[57] ABSTRACT

A distributed processing system distributively performs a series of processes for a job at a plurality of processing units connected to a common transmission path and has a circuit for transmitting information from a processing unit to the common transmission path. The distributed processing system includes a circuit for receiving from the common transmission path the information required for the processing of a program stored in each processing unit, and a circuit for detecting if all the information required for the processing of the program has been collected, for performing the processing of the program using the collected information as input information for the processing and for transmitting the processed result data to the common transmission path. Managing of the programs is performed by transmitting a program stored in each processing unit or a program newly generated or modified by each processing unit, together with program generation information, to the common transmission path and discriminating a difference between generations of a plurality of developed programs.

24 Claims, 5 Drawing Sheets

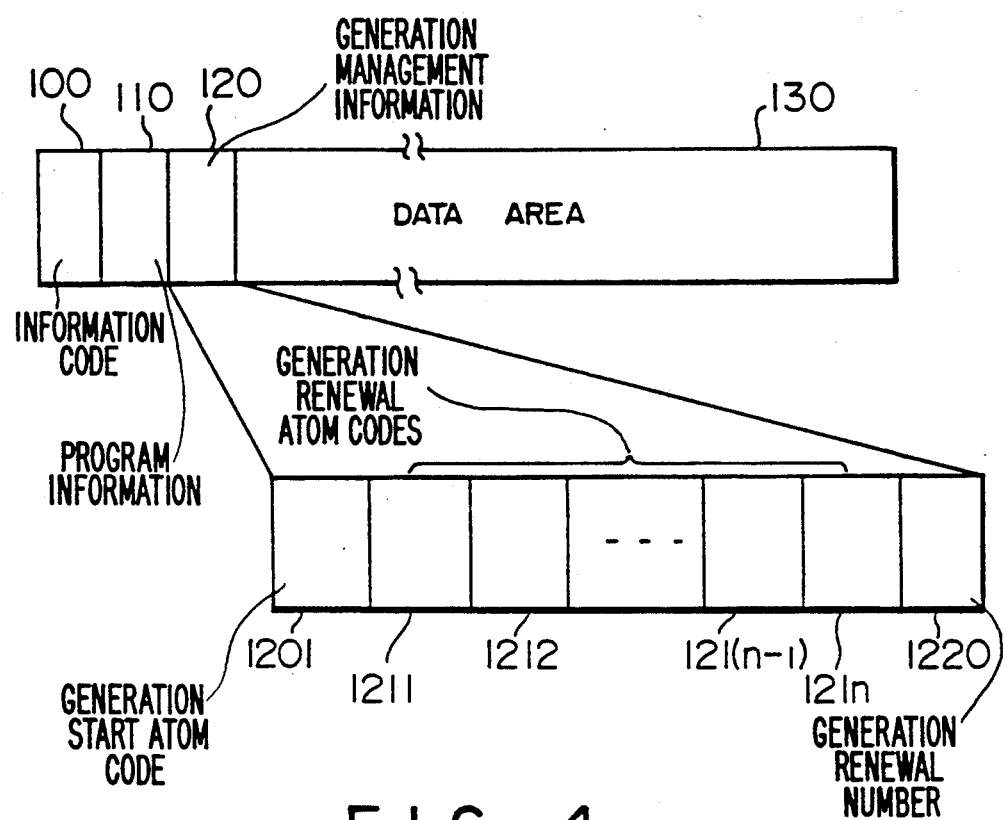
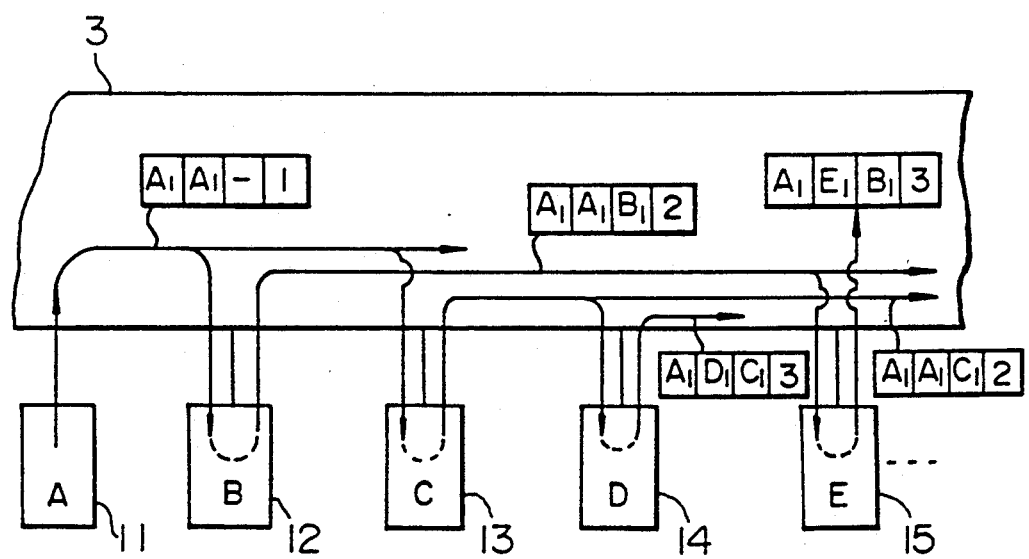

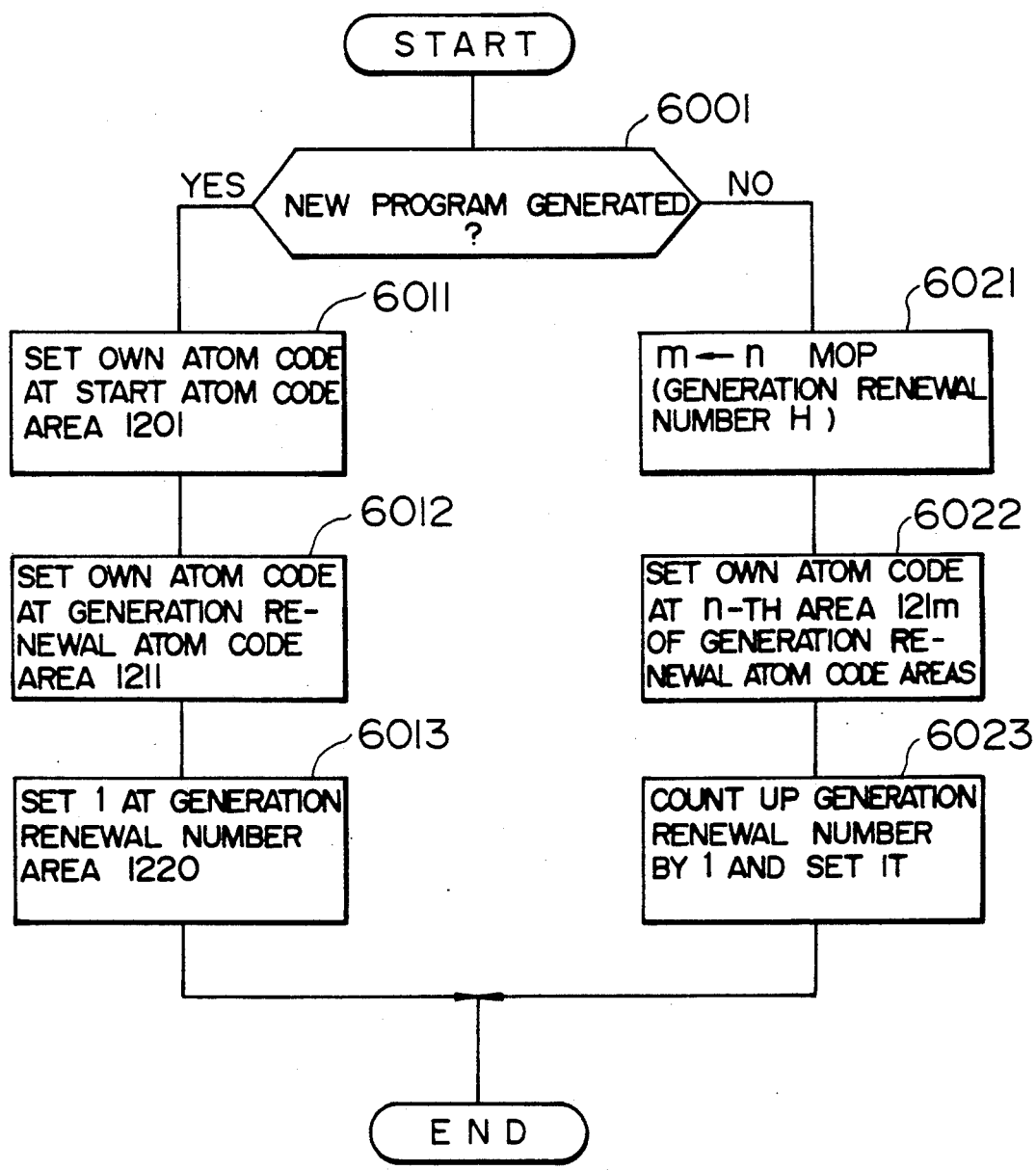

METHOD OF MANAGING PROGRAMS FOR DISTRIBUTED PROCESSING SYSTEMS AND APPARATUS THEREFOR

BACKGROUND OF THE INVENTION

The present invention relates to a method and apparatus for managing programs for distributed processing systems, and more particularly, to a program managing method and apparatus suitable for developing programs at a plurality of processing units while definitely maintaining a mutual relationship between the developed programs.

Conventionally, programs have been developed in a centralized manner. Therefore, in developing a new program version from an original program by way of modification/addition, the new program has been assigned only a serial number (generation number) representative of the number of revisions added to the original program. It therefore becomes possible to judge how old a developed program is. (Refer to the description of JP-A-60-252952, for example).

This conventional method however does not consider the case wherein in a distributed processing system having a plurality of processing units, a new program is developed by a processing unit by performing modification/addition of a certain program developed by another processing unit. In such a case, if the above conventional method is used, there is a possibility of assigning the same generation number to programs having different contents.

SUMMARY OF THE INVENTION

It is an object of the present invention to provide a method and apparatus for managing programs for a distributed processing system wherein each of a plurality of processing units can independently discriminate programs developed by a plurality of processing units, without providing a centralized management function of the system, to grasp a mutual relationship therebetween and identify a particular generation.

To achieve the above object, the present invention is characterized in that for the development of programs of a distributed processing system, a program in each processing unit is caused to be sent out onto a transmission path in a manner similar to ordinary data transmission, and that each processing unit picks up a program required for developing a new program and adds information on revision history thereto to relay the information added program to other processing units.

BRIEF DESCRIPTION OF THE DRAWINGS

FIG. 3 shows an example of the format of a message to be transmitted over a transmission path;

FIG. 4 illustrates an example of developing a program using the program management method of this invention;

FIG. 6 is a flow chart showing an example of the procedure of setting generation management information.

DESCRIPTION OF THE PREFERRED EMBODIMENTS

Figure 1:
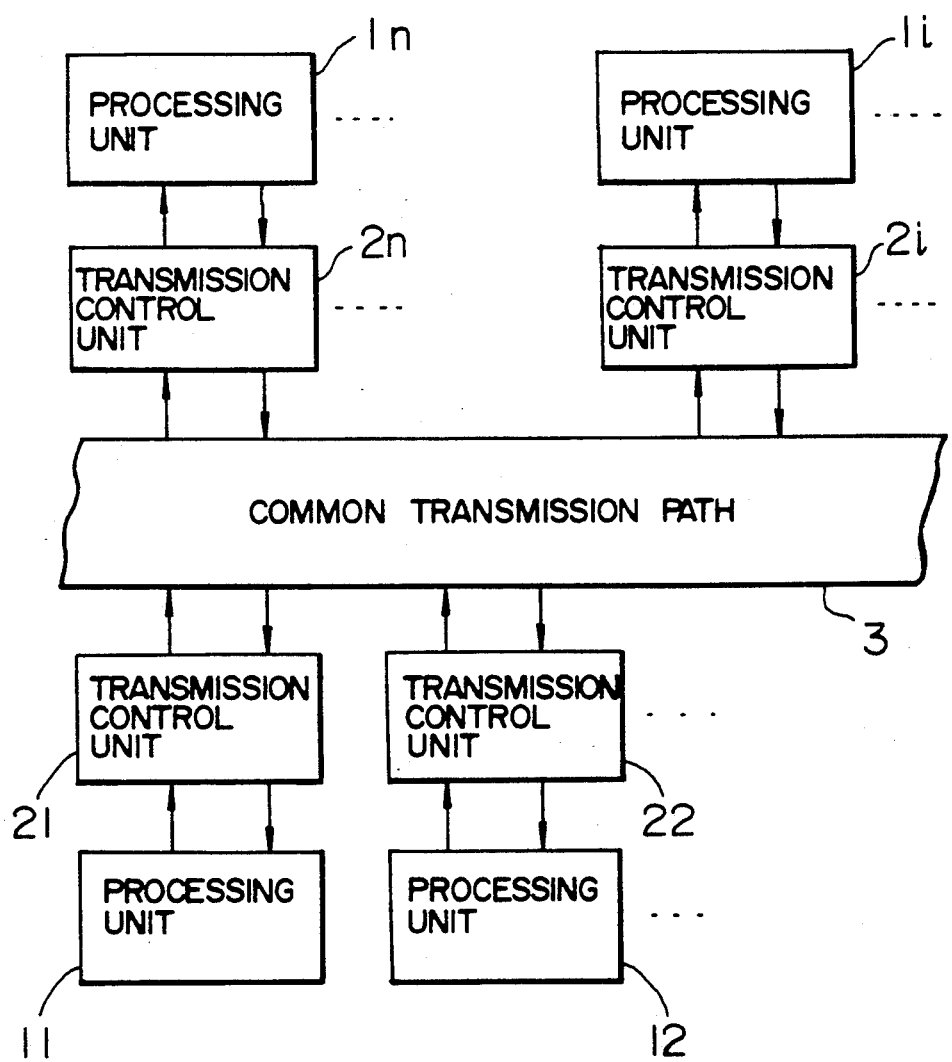
FIG. 1 is a block diagram showing an embodiment of a distributed processing system for practicing the program management method of this invention.
Figure 2:
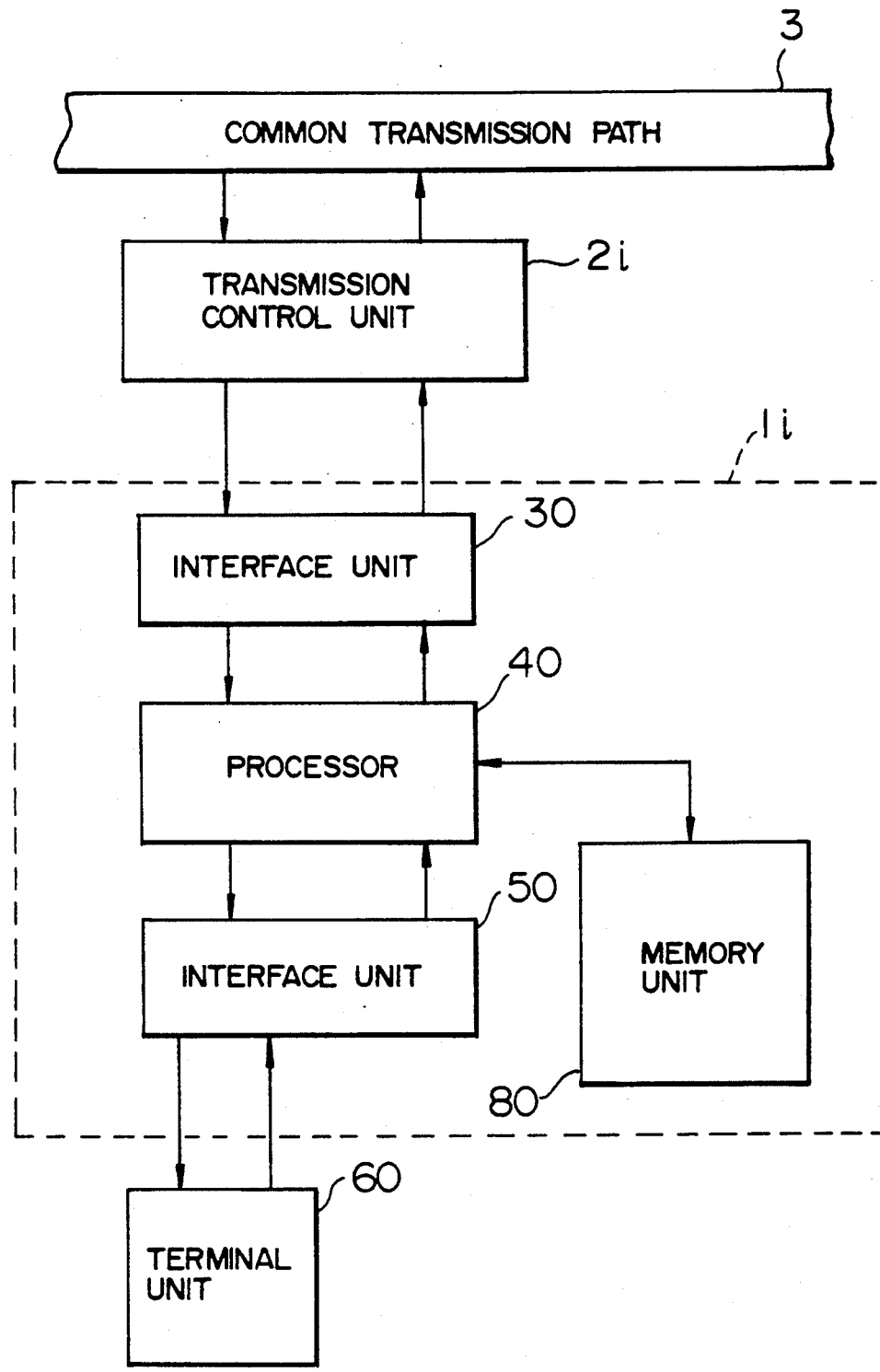
FIG. 2 is a block diagram showing an example of the arrangement of a processing unit in the distributed processing system shown in FIG. 1.

An embodiment of this invention will now be described with reference to the accompanying drawings. FIG. 1 is a block diagram showing an example of the arrangement of a distributed processing system for practicing the method of this invention. In the distributed processing system, each processing unit 11, 12, ... , 1n can be mutually coupled, via a common transmission path 3, by using each transmission control unit 21, 22, ... , 2n connected to each associated processing unit. As shown in FIG. 2, each processing unit 1i is constructed of a memory unit 80, interface units 30 and 50, a terminal unit 60 and a processor 40.

The terminal unit 60 has man-machine interfaces such as a video data terminal (VDT) and a keyboard so that a user can perform modification/addition of a program by using development tools such as software editors, compilers and linkers contained in the processing unit.

FIG. 3 shows an example of the transmission format of information flowing on the common transmission path. The information flowing on the transmission path is checked by the transmission control unit of each processing unit of the distributed processing system. An information content code 100 is read to judge if it is a desired code or not. In case of a desired code, the information is sent to the processing unit and read as input data for a particular program among those programs stored in the processing unit, the program being executed after processing all the information having desired codes. (Desired codes are stored in the memory unit of the transmission control unit, the detail of which is described, e.g., in JP-A-57-146361).

The contents of a program made at least by one of the processing units in the distributed processing system and transmitted over the common transmission path are written in a data area 130 shown in FIG. 3.

Information on the program written in the data area is written in a program information area 110. The program information represents the contents of the program concerned, which can be described, e.g., using its input/output relation (by an input content code and an output content code representative of a processed result). By reading the program information, it becomes possible to identify the contents of the program flowing on the transmission path. The program information can be set from the terminal unit 60 or external equipment shown in FIG. 2 in a man-machine manner when the modification/addition for the program was performed.

Generation information of the program is written in a generation management information area 120. The generation information is added to the program in order to recognize that the program was revised by one or more processing units. It is used to discriminate between programs which have undergone a revision such as partial addition, deletion or replacement without changing the program content (input/output relation).

Items set in the generation management information area 120 are as in the following:

(a) Generation Start Atom Code 1201

This code (processing number, address or the like) identifies a processing unit which first generated the program. The phrase "first generated" means herein that the program information was newly entered for the program generated at or modified by a processing unit. Particularly, even if only a partial modification is made to a program, if the program input/output relation changes and the program information area 110 is rewritten, it is considered that a new program was generated having a new (first) generation. On the other hand, if the program information area 110 does not change, the programs before and after modification are considered as having the same content (only with a change in generation number). A change in input/output relation of the program is determined based on a relation between the input data content code and the output data content code representative of the processed result by the program. Namely, at the end of modification of the program, the program information area is checked. If the data content codes are different from those before the modification, it is considered that a new generation program was generated. This is also true for the case where a program is generated from a plurality of different programs. Namely, (1) if the input/output relation of a modified program is the same as that of any one of a plurality of programs from which the program was generated, then the first-mentioned program corresponds to the generation information of the second-mentioned program, if any, and (2) if there is no such program within the plurality of programs having the same input/output relation, then the first-mentioned program is considered as having a new (first) generation. The above case (1) corresponds to the case where a partial addition or replacement of a program was performed, and the case (2) corresponds to the case where a program quite different from the plurality of programs was generated.

(b) Generation Renewal Atom Codes 121l to 121n

These codes are used for the program which underwent the modification. There are provided n (where n is 1 or more than 1) areas for the generation renewal atom codes so that generation renewal atom codes up to n generations can be written. Of the n areas of this embodiment, the area for the code 121n represents the processing unit which last brought about the renewal, and the area for the code 1211 represents the processing unit which brought about the renewal n times before.

(c) Generation Renewal Number 1220

The number indicates the number of renewals after the program was first generated (i.e., after the program information area was first set).

An example of setting the generation management information area 120 described above is shown in FIG. 4. FIG. 4 shows how a program is generated and modified by five processing units A to E at 11 to 15 which are coupled together by the common transmission path 3 indicated by 11 to 15 (with transmission control units omitted in the Figure). Of the message flowing on the common transmission path 3, only the generation management information is shown in FIG. 4. In this example, it is assumed that the number of generation renewal atom code areas is two, so that two atom codes for the program having an identical program information area are added, one code being for the last renewal and the other for the second last renewal. The last renewal atom code is written alternately at the right and left areas of the two code areas.

Figure 5:
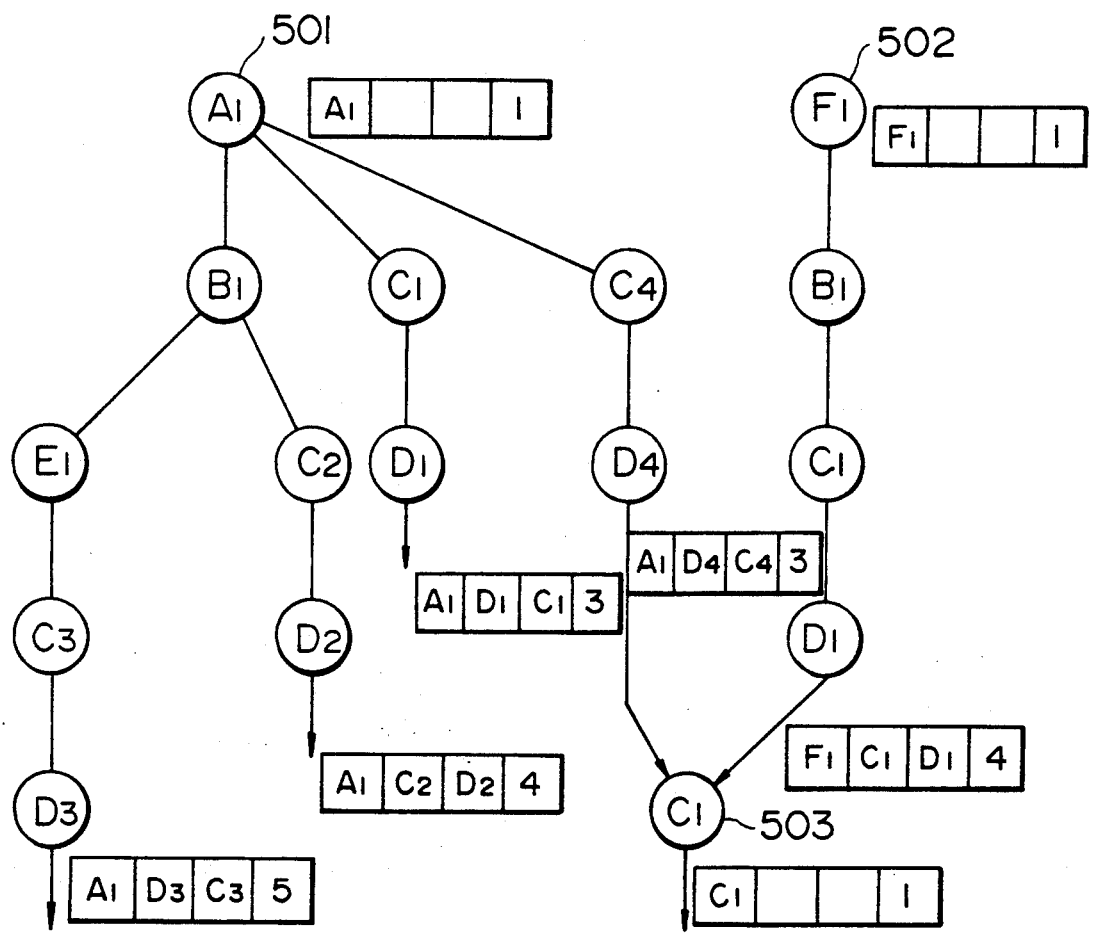
FIG. 5 is a diagram showing an example of a mutual relationship between programs during a program generation management by the method of this invention.

FIG. 5 shows an example of a mutual relation between the arrangement of developed programs and added information to the generation management information area, while a plurality of distributed processing units are developing programs by using the method of this invention. Each processing unit checks programs received from the transmission path. Even if the programs are judged, by monitoring the program information areas, that they have the same program contents, the programs can be discriminated as to their difference, the number of renewals and the renewal history, by monitoring the generation management information areas.

Referring to FIG. 5, new programs are first generated at 501 and 502 and thereafter subjected to modification by processing units A to F. The programs first generated at 501 and 502 and thereafter subjected to modification by each processing unit increase the number of renewals by 1 at each modification. The increase in number of modifications means that only a partial modification has been performed to the program and the input/output relation of the program was not changed. However, at the processing unit 503, a new program is first generated from two programs having different input/output relation so that the number of generation renewals of the program outputted from the processing unit 503 has been reset at 1. Thus, in the following processes, the program is considered as quite a new one.

FIG. 6 is a flow chart showing the setting procedure of generation management information by a processing unit.

First, if it is decided (at step 6001) that a developed objective program is a newly generated one, its own atom code is set in the generation start atom code 1201 area (step 6011) to then set the number of generation renewals at 1 (step 6012). If it is decided (at step 6001) that the developed objective program is a modified one of an already generated program, a renewal area m of the generation renewal atom code areas is obtained (step 6021) to set its own atom code in the m generation renewal atom code area and increment the generation renewal number by 1 (step 6023).

The number of generation renewal atom areas is represented by n in FIG. 6.

In the example shown in FIG. 6, in order to set the generation renewal atom code area, the modulo of the area number is used to determine the area in which a generation renewal number is to be set. The setting method is not limited thereto, but other setting methods may be applied. For example, if the renewal more than the number of areas is repeated, the areas may be shifted by one to erase the area set earliest.

According to the present invention, in developing programs at a plurality of processing units in a distributed processing system while definitely maintaining a mutual relationship between the developed programs (e.g., in developing programs based on a starting program by modifying it at a plurality of processing units in parallel, or by modifying it at different positions thereof sequentially at a plurality of processing units), the generations of and mutual relationship between the programs can be readily recognized. Further, according to the present invention, a centralized management function for managing all of the programs is not needed at all, and programs can be developed without influences by the increase of processing units in the system or the failure of processing unit(s).

We claim:

1. A method for managing generation management information for programs in a distributed processing system having a plurality of processing units connected to a common transmission path, said method comprising the steps of:
a) transmitting a program and generation management information of said program from one of said processing units onto said common transmission path;
b) receiving said program and said generation management information at another one of said processing units;
c) modifying said program at said another processing unit; and
d) managing said generation management information in response to said modifying step; said managing step comprising the steps of:
  i) replacing the generation management information with information indicating said program is new if a relationship between input data nd output data of said program has been altered as a result of said program modification, and
  ii) adding information indicative of program modification to said generation management information if the relationship between said input data and said output data of said program has not been altered as a result of said program modification.

2. The method according to claim 1, wherein said adding step comprises the step of adding to said generation management information a discriminator identifying said another processing unit as having modified said program.

3. The method according to claim 1, wherein said transmitting step comprises the step of transmitting onto said common transmission path along with said program and said generation management information content codes representative of said input data and said output data of said program; and
wherein said managing step further comprises the step of recognizing the relationship between said input data and said output data using said content codes.

4. The method according to claim 3, wherein said adding step comprises the step of adding to said generation management information a discriminator identifying said another processing unit as having modified said program.

5. The method according to claim 1, wherein said generation management information includes information representative of one of said processing units which modified said program.

6. The method according to claim 5, wherein said generation management information further includes information representative of one of said processing units which first generated said program.

7. The method according to claim 5, wherein said generation management information further includes information representative of the number of modifications performed on said program.

8. The method according to claim 1, wherein said transmitting step comprises the step of transmitting an information content code onto said common transmission path along with said program and said generation management information; and
wherein said receiving step comprises the step of determining whether said program and said generation management information are to be received by said another processing unit based on said information content code.

9. The method according to claim 8, wherein said generation management information includes information representative of one of said processing units which modified said program.

10. The method according to claim 9, wherein said generation management information further includes information representative of the number of modifications performed on said program.

11. The method according to claim 9, wherein said generation management information further includes information representative of one of said processing units which first generated said program.

12. The method according to claim 11, wherein said adding step comprises the step of adding to said generation management information a discriminator identifying said another processing unit as having modified said program.

13. An apparatus for managing generation management information for programs in a distributed processing system having a plurality of processing units connected to a common transmission path, said apparatus comprising:
a) means for transmitting a program and generation management information of said program from one of said processing units onto said common transmission path;
b) means for receiving said program and said generation management information at another one of said processing units;
c) means for modifying said program at said another processing unit; and
d) means for managing said generation management information in response to said modifying means; said managing means comprising:
  i) means for replacing the generation management information with information indicating said program is new if a relationship between input data and output data of said program has been altered as a result of said program modification, and
  ii) means for adding information indicative of program modification to said generation management information if the relationship between said input data and said output data of said program has not been altered as a result of said program modification.

14. The apparatus according to claim 13, wherein said adding means comprises means for adding to said generation management information a discriminator identifying said another processing unit as having modified said program.

15. The apparatus according to claim 13, wherein said transmitting means comprises means for transmitting onto said common transmission path along with said program and said generation management information content codes representative of said input data and said output data of said program; and
wherein said managing means further comprises means for recognizing the relationship between said input data and said output data using said content codes.

16. The apparatus according to claim 15, wherein said adding means comprises means for adding to said generation management information a discriminator identifying said another processing unit as having modified said program.

17. The apparatus according to claim 13, wherein said generation management information includes information representative of one of said processing units which modified said program.

18. The apparatus according to claim 17, wherein said generation management information further includes information representative of one of said processing units which first generated said program.

19. The apparatus according to claim 17, wherein said generation management information further includes information representative of the number of modifications performed on said program.

20. The apparatus according to claim 13, wherein said transmitting means comprises means for transmitting an information content code onto said common transmission path along with said program and said generation management information; and
   wherein said receiving means comprises means for determining whether said program and said generation management information are to be received by said another processing unit based on said information content code.

21. The apparatus according to claim 20, wherein said generation management information includes information representative of one of said processing units which modified said program.

22. The apparatus according to claim 21, wherein said generation management information further includes information representative of the number of modifications performed on said program.

23. The apparatus according to claim 21, wherein said generation management information further includes information representative of one of said processing units which first generated said program.

24. The apparatus according to claim 23, wherein said adding means comprises means for adding to said generation management information a discriminator identifying said another processing unit as having modified said program.

* * * * *